United States Patent [19]
Young et al.

[11] 3,760,915
[45] Sept. 25, 1973

[54] AUGER APPARATUS DRIVE MEANS

[75] Inventors: William G. Young; Frederick G. Horning, both of Salem, Ohio

[73] Assignee: The Salem Tool Company, Salem, Ohio

[22] Filed: June 24, 1971

[21] Appl. No.: 156,572

Related U.S. Application Data

[62] Division of Ser. No. 851,696, Aug. 20, 1969, Pat. No. 3,663,062.

[52] U.S. Cl............. 192/48.3, 74/340, 74/665 GA, 175/108, 299/57
[51] Int. Cl.......................... F16d 47/00, E21c 1/00
[58] Field of Search.................... 74/15.2, 15.4, 340, 74/665 G, 665 GA, 665 GB, 665 GC, 665 GD, 665 GE; 299/55, 56, 57; 175/91, 108; 172/103; 192/48.3

[56] References Cited
UNITED STATES PATENTS

| | | | |
|---|---|---|---|
| 2,108,078 | 2/1938 | Russell............... | 172/79 X |
| 2,230,757 | 2/1941 | Long................. | 173/146 X |
| 2,597,514 | 5/1952 | Nash................. | 64/30 C |
| 2,642,971 | 6/1953 | Hagenbook.......... | 64/30 C X |
| 2,743,085 | 4/1956 | Mermis.............. | 173/146 |
| 2,940,740 | 6/1960 | Adams............... | 299/59 X |
| 3,041,054 | 6/1962 | Ball.................. | 299/59 X |
| 3,236,315 | 2/1966 | Lora.................. | 299/55 X |
| 3,362,092 | 1/1968 | Speicher et al...... | 172/103 |
| 3,511,349 | 5/1970 | Herscovici........... | 64/30 C X |
| 2,539,589 | 1/1951 | Pacas................. | 74/15.4 X |
| 3,108,645 | 10/1963 | Hill.................. | 175/108 |
| 3,507,372 | 4/1970 | Gilbertson et al.... | 74/15.4 X |
| 3,242,753 | 3/1966 | Standing et al...... | 74/340 |
| 2,113,917 | 4/1938 | Jersey............... | 74/15.4 X |
| 2,672,056 | 3/1954 | Stone................ | 74/15.4 |

*Primary Examiner*—Allan D. Herrmann
*Attorney*—Bosworth, Sessions, Herrstrom & Cain

[57] ABSTRACT

Auger apparatus, such as a coal mining machine, adapted to utilize one or more augers. Apparatus is disclosed embodying three augers in which two side augers are driven from a power source, and an intermediate auger is located between, and driven from one of, the side augers. Apparatus is also disclosed having a rigid cutting head assembly comprising three or more augers. Also disclosed is apparatus having a main gearbox connected to adjustable or removable auxiliary gearboxes, so that the apparatus can be adapted to drive one or more augers from a main gearbox. Also disclosed is an auger power system embodying two clutches the first of which, preferably a mechanical clutch, is located between the engine and the transmission and is used to disconnect the transmission from the engine to permit shifting of transmission gears, and the other of which clutches, a non-mechanical clutch such as an air clutch, is located between the transmission and the uager or augers and is used as the operating clutch.

12 Claims, 20 Drawing Figures

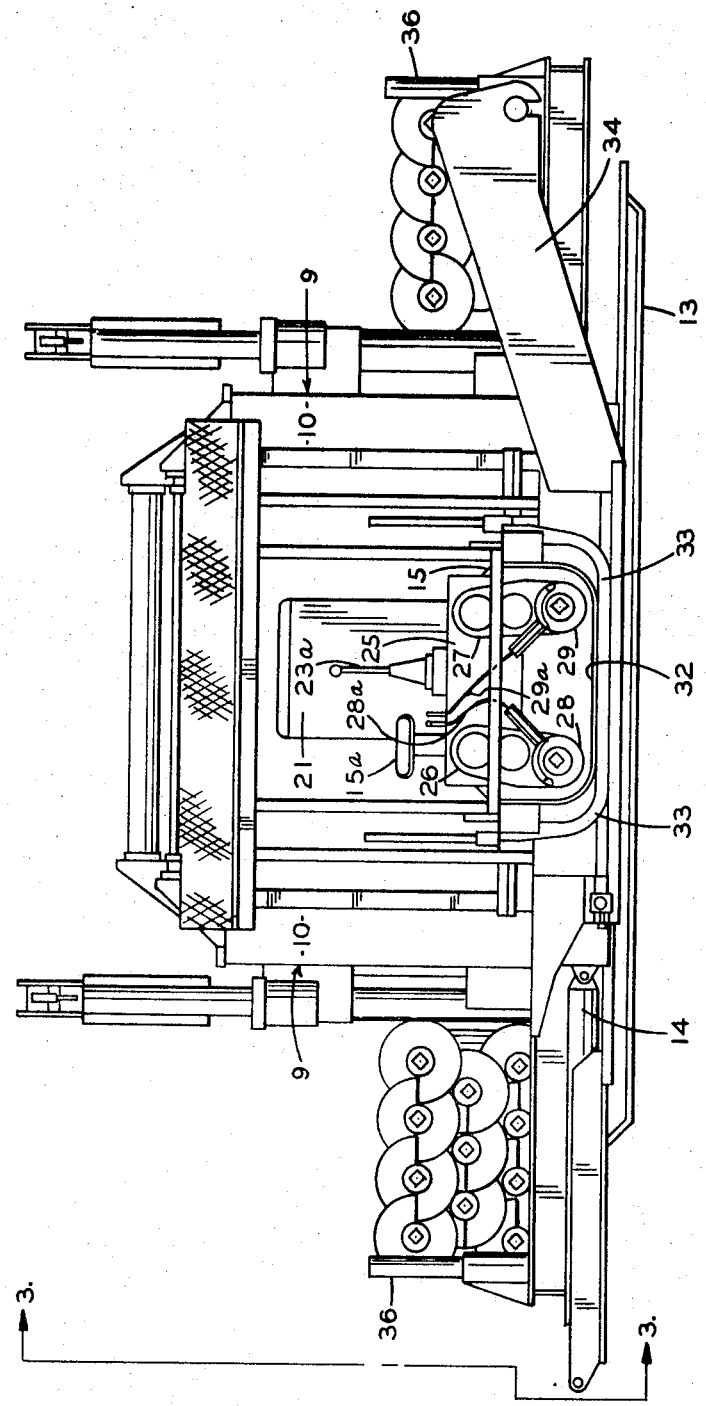

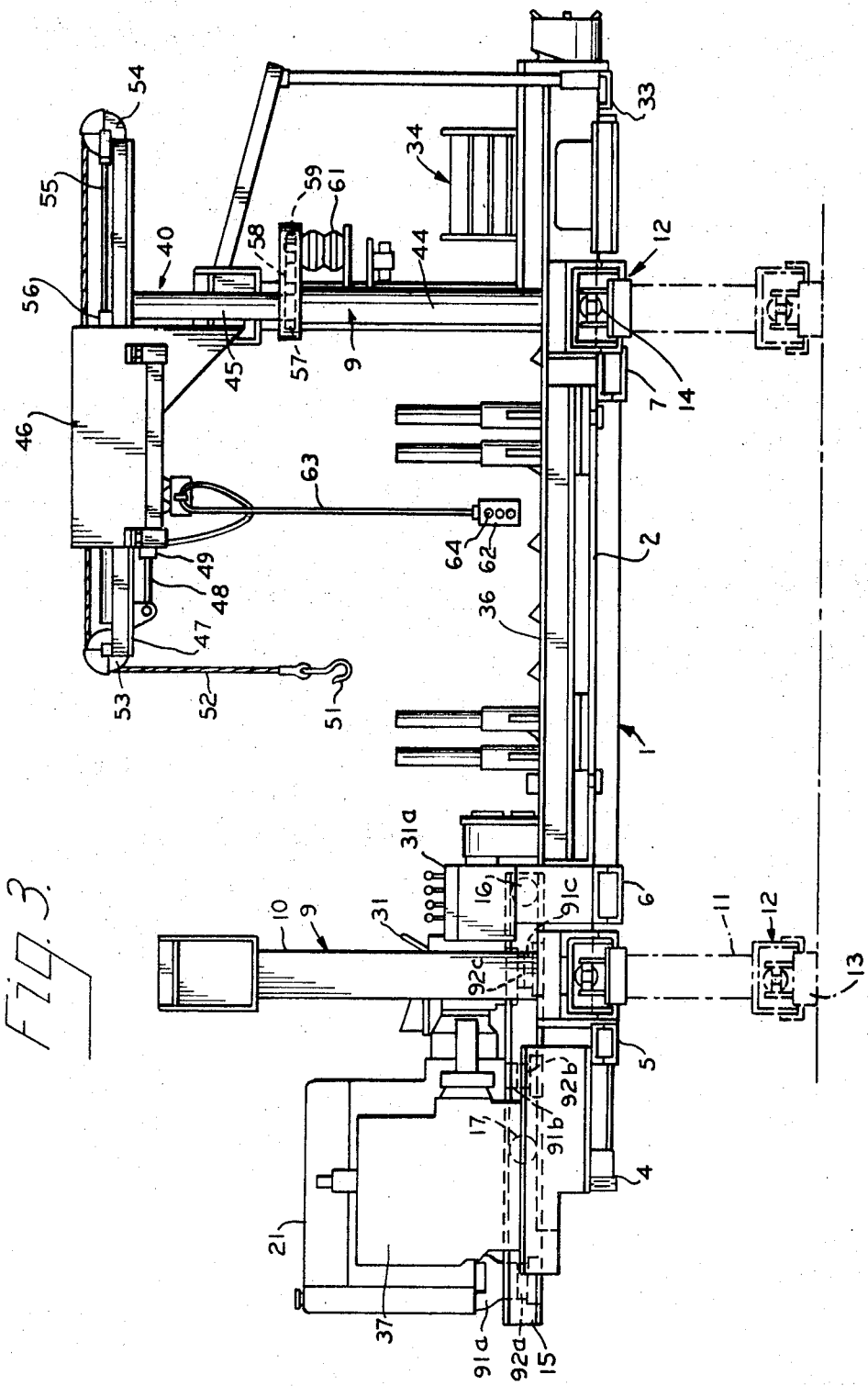

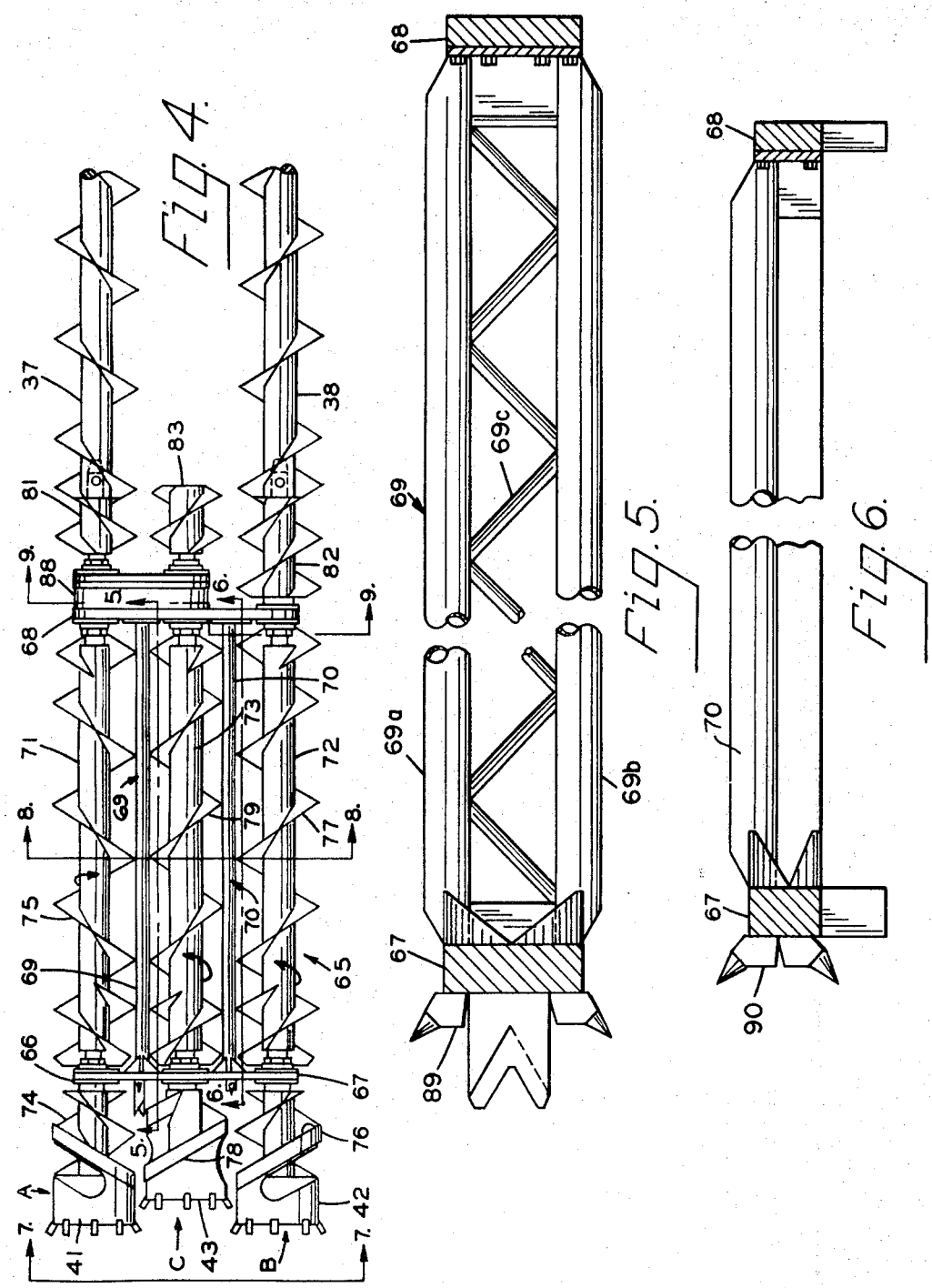

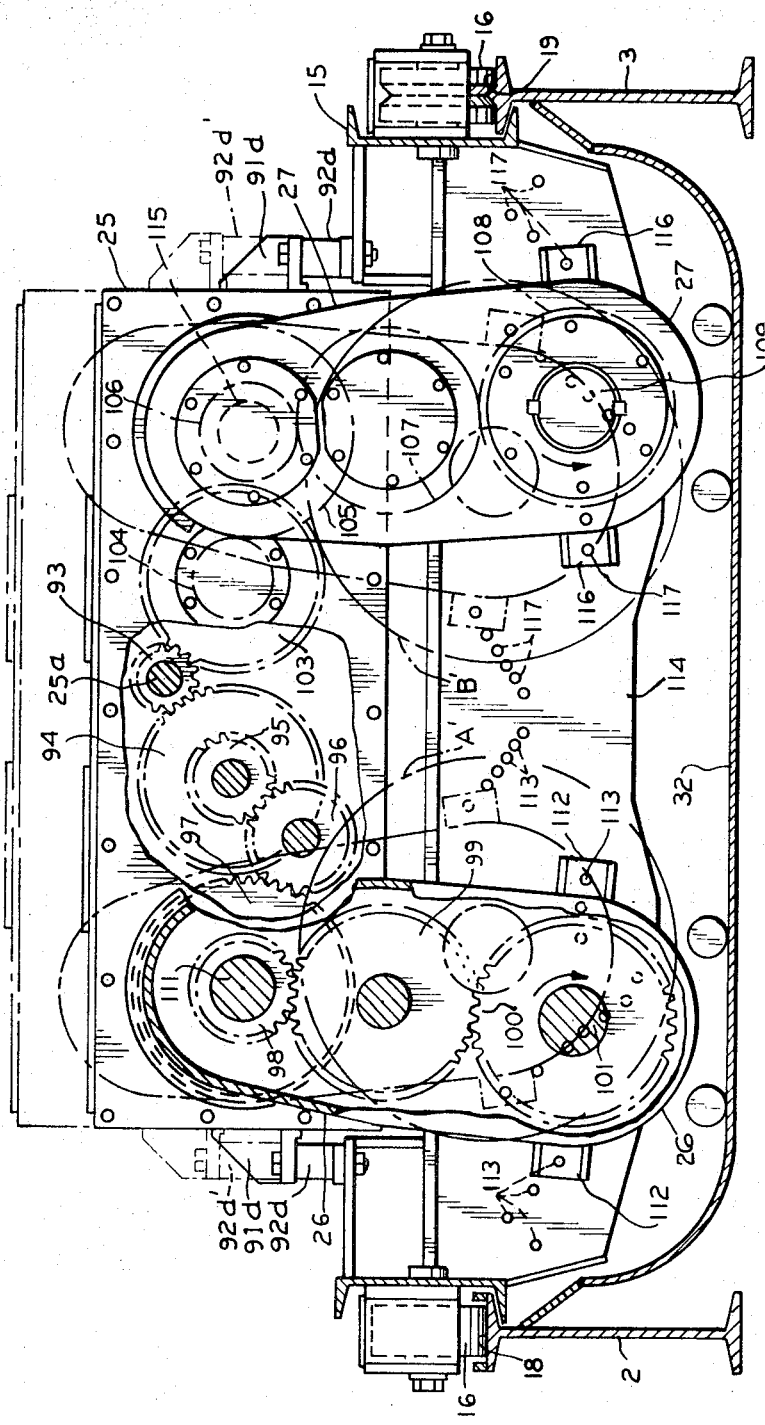

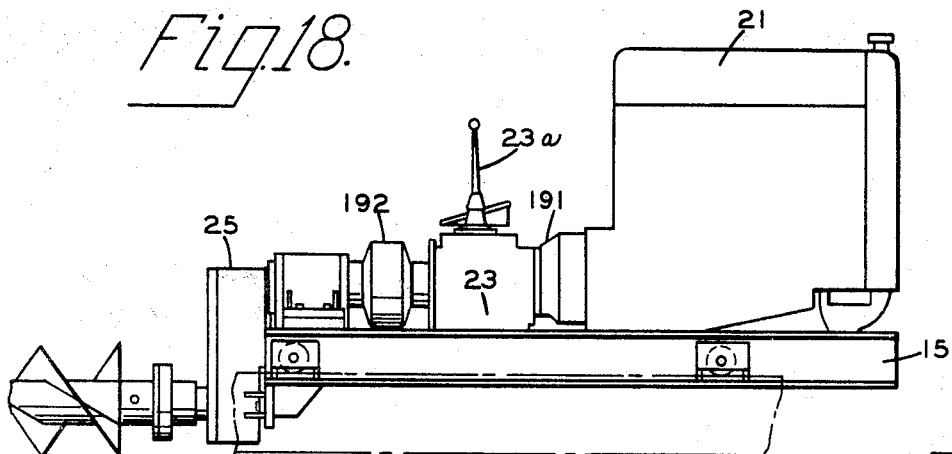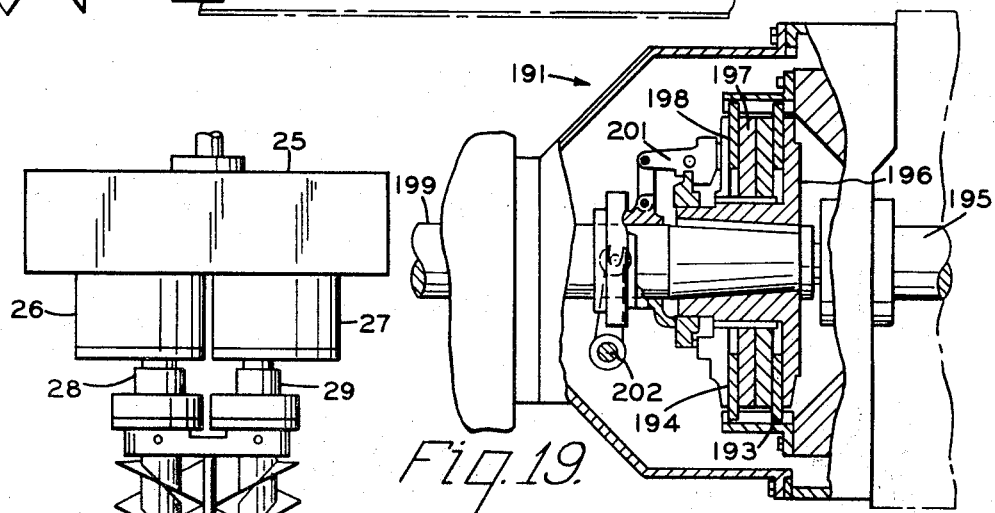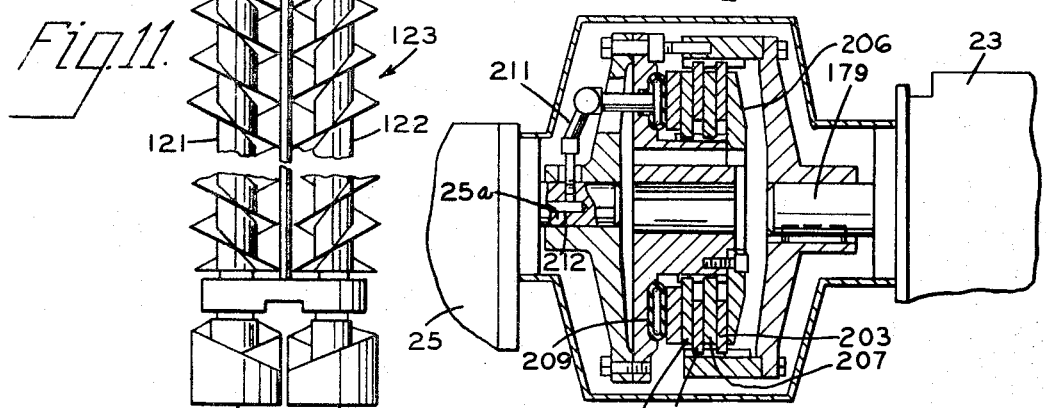

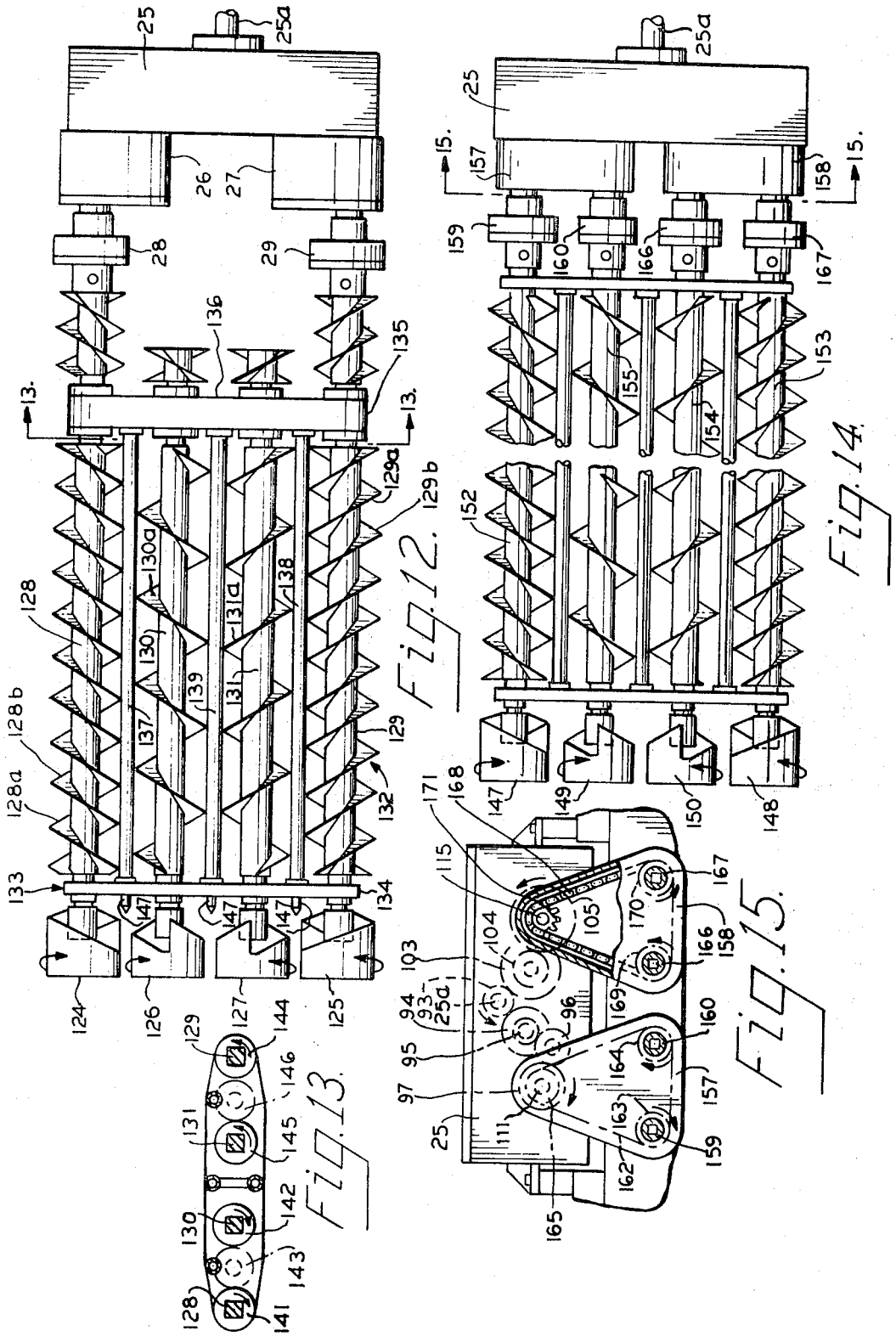

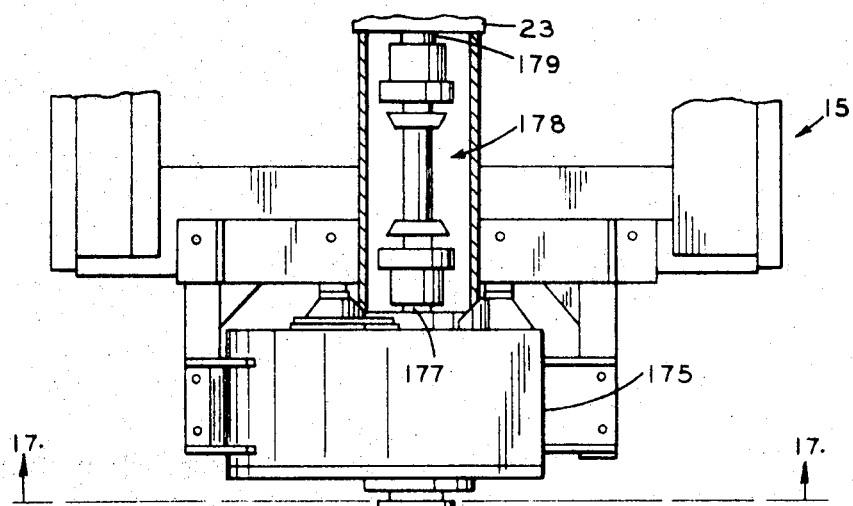
Fig. 16.
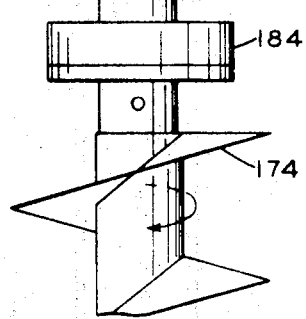
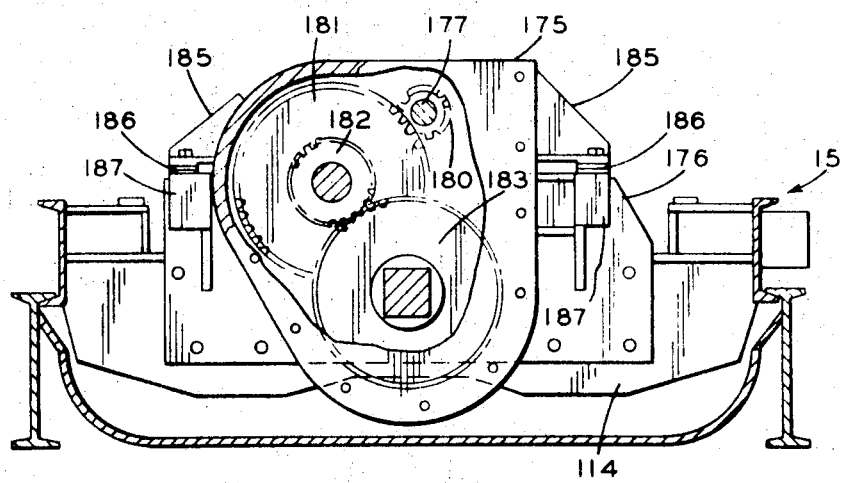
Fig. 17.

AUGER APPARATUS DRIVE MEANS

CROSS REFERENCE TO RELATED APPLICATIONS

This application is a division of application Ser. No. 851,696, filed Aug. 20, 1969 now U.S. Pat. 3,663,062 issued May 16, 1972.

FIELD OF THE INVENTION

This invention relates generally to auger apparatus providing increased flexibility in operation by permitting variations in the numbers and sizes of augers used, as well as in other features.

While the invention may be employed to advantage for other purposes, it provides exceptional advantages when employed in auger mining machines of the type adapted to be positioned adjacent the wall of an outside pit to recover coal in a seam that is exposed in such wall and extends generally horizontally into the earth. Therefore for convenience the invention will be discussed in connection with such machines.

Auger mining machines of this type comprise one or more augers each embodying a cutting head of relatively large diameter connected to and rotationally driven by a string of helically vaned auger sections driven from the machine. The cutting head penetrates the coal seam, and the mined coal is transported rearwardly from the cutting head along the vaned auger string to the entrance of the hole cut by the cutting head, where the coal is collected and removed.

After the cutting head has penetrated the desired distance, it is withdrawn while the auger sections are removed in a known manner until the cutting head is out of the hole, after which the machine as a whole may be moved laterally relative to another position where its auger or augers can drill a hole or holes generally parallel to the previously drilled holes.

While two parallel augers have been used on such a machine, as a practical matter heretofore more than two augers have not been used on a machine because of difficulties of transmitting power to rotate more than two cutting heads, and removing coal cut by more than two cutting heads. Furthermore, in auger machines heretofore used it has not been possible to vary the number of augers used, and often it has not been possible to use on a single machine augers of diameters in a wide range.

These limitations on prior machines have inhibited the primary objectives of mining as much coal as possible in a seam with as little waste as possible, in the shortest time possible, at the lowest possible costs of machine operation, investment in the machine, and labor. Reasons will be apparent from the following.

The maximum diameter of the auger to be used is largely determined by the thickness of the coal seam, an auger of smaller diameter being used for a thinner seam, and an auger of larger diameter being used for a thicker seam. Occasionally, a coal seam that is being mined varies in thickness, or in the same pit wall there are seams of widely varying thicknesses; and often in the locality in which the mining machine is working there are different seams of widely varying thicknesses.

It is desirable that a single machine be capable of driving augers of widely varying diameters, and widely varying numbers of augers, in order to permit maximum utilization of the machine and maximum recovery of coal with the single machine without the necessity of bringing in other machines. For a given power output of an auger machine, it is most desirable that the machine be capable of driving a single auger of as large a diameter as possible, and that it also be capable of driving several augers of smaller diameters from the same power output, within the power output capabilities.

Auger mining machines heretofore available have not been as flexible as desired from standpoints of making possible the use on a single machine of augers of a wide range of diameters or of varying numbers of augers to meet varying conditions under which coal is mined. Often, either the power available, investment in the machine, and operating labor has been underutilized when the machine has been used to mine coal in thin seams, or the auger machine has been unable to be as efficient as desired in mining coal from thick seams because of lack of power or inability to handle large augers. These problems are accentuated because auger machines, although capable of being moved from one mining location to the other, are quite large and cumbersome and require considerable effort and equipment to move them so that it is not feasible to switch machines for various seam thicknesses in a local area.

SUMMARY OF THE INVENTION

The present invention provides auger apparatus, preferably mining machines of the type discussed above, that overcome such disadvantages and provide greatly increased flexibility in operation because they may be made adaptable to various mining conditions without the necessity of replacing them with different machines.

According to the present invention, an auger mining machine may be provided that is adapted to drive one, two, three or even more augers from a given power source as required; these augers may fall in a wide range of diameters. A machine may also be provided embodying three augers in which two augers are driven from a power source on the machine, and a third auger is located between and driven from one of the side augers, preferably by gears, from a location near the outer end of such side auger, the side auger that drives the third auger being substantially free of the load of conveying mined material away from the cutting head of the third auger, so that the load of driving the center auger is on one of the side augers which conveys away substantially only the material cut by its own cutting head, while the load of conveying material cut by the cutting heads of the other side auger and the third auger is substantially all on such other side auger, thus in effect distributing the total load. The side augers preferably rotate in opposite directions relative to each other and the intermediate third auger preferably rotates in the direction opposite to that of the side auger that drives the center auger.

According to another aspect, when the auger machine has three or more augers, longitudinal tie bars are located between and rigidly fixed to cross members in an assembly rotatably supporting the cutting heads to provide a rigid structure that penetrates the seam and is connected to power driven auger strings that drive the cutting head.

According to another aspect, an auger machine is provided having a drive system embodying two clutches in series, one preferably a mechanical clutch located between the engine and transmission that is used only to disconnect the transmission from the engine so that the transmission can be shifted to another rotational speed, and the other clutch a non-mechanical clutch such as an air clutch between the transmission and the augers that is used as the operating clutch to permit necessary slippage between the auger and the power source and make possible momentary variations in rotational speed of the auger.

It is an object of the invention to provide auger apparatus that overcomes the disadvantages indicated above of prior apparatus. It is another object of the invention to provide auger apparatus embodying as many as desired of the features summarized above, including apparatus providing all of such features. It is a further object of the invention to provide auger apparatus that is flexible in operation in permitting the use of wide ranges of sizes of augers and a wide variety in numbers of augers. A further object is the provision of auger apparatus that is dependable in operation, requires little maintenance, and can be manufactured at reasonable cost.

BRIEF DESCRIPTION OF THE DRAWINGS

The above advantages, features and objects will become more clearly apparent from the following description of preferred embodiments of the invention in connection with the accompanying drawings in which:

FIG. 2 is a front elevation of the machine of FIG. 1 and to a slightly larger scale, the cutting head assembly being shown removed for the sake of clearness;

FIG. 3 is a side elevation of the apparatus to a scale smaller than FIG. 2, showing the cutting head assembly connected, broken lines being shown to show jacks extended to raise the main portion of the apparatus;

FIG. 4 is a plan, to a larger scale than FIG. 1, showing an assembly having three cutting heads, embodying the invention, connected to two auger sections which in turn are connected to a power source on the machine;

FIG. 5 is a section to a still larger scale of one of the tie bars of the assembly, along line 5—5 of FIG. 4;

FIG. 6 is an enlarged section showing another tie bar along line 6—6 of FIG. 4;

FIG. 10 is a view along line 10—10 of FIG. 1 showing a main gearbox carrying two auxiliary gearboxes containing gears for driving two augers, and also showing how the auxiliary gearboxes can be moved to various positions relative to the main gearbox and machine frame, to accommodate different auger sizes;

FIG. 11 illustrates another embodiment in which two augers are driven from a main gearbox and auxiliary gearboxes of apparatus like that shown in FIG. 10;

FIG. 12 illustrates in plan another embodiment in which four cutting heads are driven by two auger sections from two auxiliary gearboxes on a main gearbox of apparatus otherwise like that shown in FIG. 10.

FIG. 13 is a section along line 13—13 of FIG. 12 showing how two intermediate cutting heads in the cutting head assembly are driven from two side augers;

FIG. 14 is another modification showing how four cutting heads can be driven from a main gearbox through two auxiliary gearboxes of a different type;

FIG. 15 is a section along line 15—15 of FIG. 14;

FIG. 16 is a plan showing another modification, illustrating how a single auger can be driven from a machine otherwise like that of the previous figures;

FIG. 17 is a section along line 17—17 of FIG. 16 showing the drive for the single auger;

FIG. 18 is a side elevation of another modification, illustrating the combination of a mechanical clutch between the engine and transmission, and an air clutch between the transmission and the auger drive means;

FIG. 19 is an enlarged side elevation of the mechanical clutch of FIG. 18, parts being broken away; and FIG. 20 is an enlarged side elevation of the air clutch of FIG. 18, parts being broken away.

DESCRIPTION OF PREFERRED EMBODIMENTS

Figure 1:
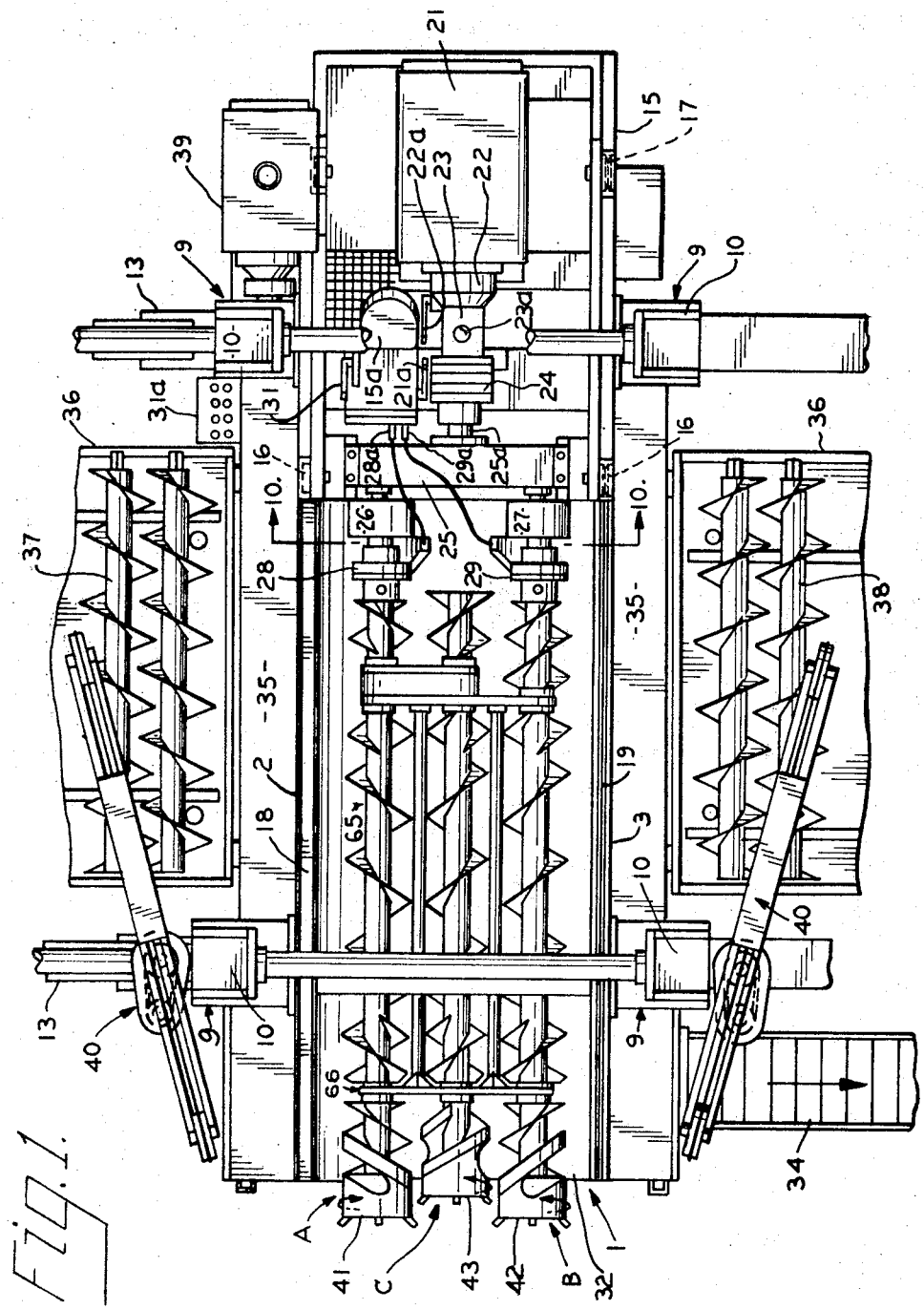
FIG. 1 is a plan of an auger mining machine, embodying the invention, useful for mining coal in seams, having a cutting head assembly having three cutting heads, connected to a power source.

The auger machine of FIGS. 1 to 10, comprises a rigid main frame 1 from which three augers A, B and C are supported and driven.

The frame comprises a pair of spaced longitudinally extending massive parallel beams 2 and 3 joined by cross members 4–7 inclusive (FIG. 3). Near its ends, and at corresponding positions on either side, the main frame is connected to four vertical jacks 9, each of which comprises a vertical outer tubular member 10 rigidly fixed to the main frame and having a telescoping inner member 11 (FIG. 3) that is adapted to be moved downwardly and upwardly out of the lower portion of the outer member 10 by suitable known means requiring no further description to raise or lower the main frame 1 as required.

The lower ends of each pair of telescoping inner members 11 of the two jacks 9 at each end of the machine carry a skid assembly 12. Each skid assembly comprises a skid 13 that is adapted to rest on the ground, and known hydraulic cylinder means 14 for causing relative movement between the lower ends of the telescoping members and the skid 13 longitudinally of the skid, and hence laterally of the main frame, for predetermined distances within design limits. The jacks therefore are capable of lifting the main frame and the portions of the machine carried by it free of the ground, and the skid assemblies permit the frame and such portions to move in directions laterally of the main frame as desired. The machine then can be lowered until the main frame contacts the ground, and the skids can be lifted upwardly free of the ground and moved laterally of the main frame so the jacks can again extend the skids and so forth until the machine is moved to a desired position. By suitable manipulation of the jacks and skids in known manners, it is possible to move the machine laterally or even closer or further from the pit wall into which the augers penetrate, as desired.

Frame 1 also supports a carriage 15 for guided movement longitudinally on main frame members 2 and 3 between an extreme rear position shown in full lines in FIG. 3, to a forward position, to advance the augers A, B, C for cutting, and to retract them for removal of auger sections, in a known manner. Carriage 15 has wheels 16, 17 (FIGS. 1, 3, 10) that ride on guide portions 18, 19 of rails 2 and 3 (FIG. 10). An internal combustion engine 21 constituting the auger driving power source, is fixed on carriage 15. It drives, through conventional mechanical clutch 22 having a clutch control lever 22a, conventional shiftable transmission 23 having a shift lever 23a, and conventional flexible coupling 24, a rotatable input shaft 25a of powertrain means comprising a main gearbox 25 mounted on carriage 15 and transmitting power through auxiliary gearboxes 26, 27 to driving heads 28, 29 (FIG. 10). Each gearbox 26, 27 constitutes auxiliary powertrain means. An operator on seat 15a on carriage 15 can manipulate engine throttle control 21a, clutch lever 22a, shift lever 23a, and known means 28a and 29a for automatically locking and unlocking auger sections to the heads 28 and 29.

The carriage is moved between its rearward and forward positions by suitable known actuating means which requires no description, controlled from conventional control means 31.

The frame 1 also includes a belly plate 32 located between and supported from longitudinal frame members 2 and 3 by downwardly depending cross members 33. The belly plate serves to support the auger sections in the machine from near the heads 28 and 29 to the front end of the machine nearest the pit wall into which the augers penetrate, and to aid in discharging mined coal moved onto the belly plate by the augers in a known manner to a drag conveyor 34 carried by the main frame 1 near the front of the machine.

The illustrated apparatus also includes catwalks 35 and storage racks 36 for auger sections 37 and 38 supported from the main frame adjacent members 2 and 3; it also includes auxiliary power means, such as an internal combustion engine 39 and appur-tenant apparatus for producing auxiliary power, such as hydraulic fluid power, which through known means is controlled from means 31a to actuate various other portions of the apparatus, such as the jacks 9, skid assemblies 12, and drag conveyor 34.

The machine of FIGS. 1 to 10 inclusive positively rotates three auger cutting heads 41, 42 and 43 of a known type, included in the three augers A, B and C, by rotation of the two side augers A and B, as will be described later. As the auger heads are rotated and caused to penetrate the coal or other material being mined, extension auger sections 37 and 38 from the racks 36 are inserted at the heads 28 and 29 when the carriage 15 is located in its rear position on frame 1, to extend the lengths of side augers A and B.

A hoist 40 for handling auger sections is supported from the main frame adjacent to and outwardly of each of front jacks 9. Each hoist comprises a vertical member 44 fixed to the frame and providing a deep socket in which a post 45 is mounted for rotation about a vertical axis. At its upper end the post rigidly carries a laterally extending elongated member 46 that slidably supports a boom 47 to permit it to extend and retract in a guided path relative to the member. The boom is connected to the piston rod 48 of a hydraulic cylinder 49 that is secured to the member 46. Thus, by suitably energizing the cylinder, the piston rod can extend or retract the boom as required.

The boom and member 46 also carry means for raising and lowering a hook 51 adapted to be connected to the auger sections to be added to or removed from the string in either auger A or B. Hook 51 is connected to a hoist line 52 that passes over a pulley 53 fixed to the front of the boom and a pulley 54 slidably mounted in member 46 for movement between an extreme outward position shown in FIG. 3 to various inner positions; such pulley is moved by a piston rod 55 of a hydraulic cylinder 56 mounted in member 46, to raise and lower the hook 51.

The post 45 of each hoist is rotated about its axis as required by a sprocket 57 on the post driven by a chain 58 from a sprocket 59 on the shaft of a motor 61 fixed to the support 44.

The angular movement of the boom 47 about the vertical axis of the post 45, the extended or retracted position of the boom, and the upper and lower positions of the hook 51 are all controlled from a pendant control unit 62 suspended by cable 63 and carrying necessary switch buttons 64 or the like to control known electrical circuits extending through the cable, to perform the desired control functions from safe, convenient locations where the operator can clearly view the operations.

Figure 7:
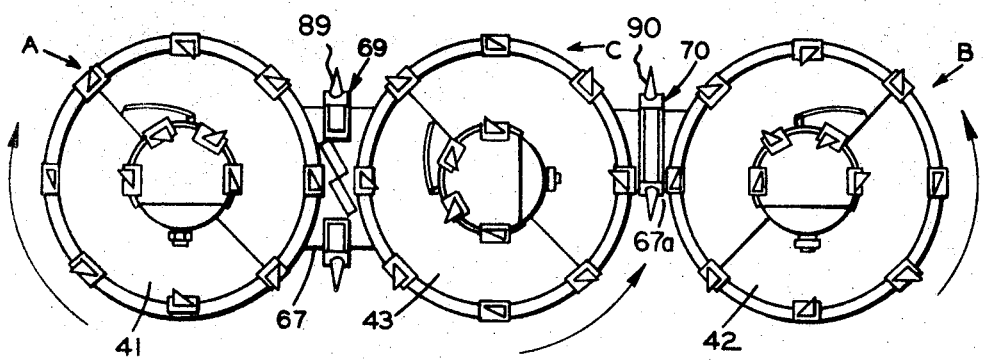
FIG. 7 is a front elevation of the assembly of FIG. 4 from line 7—7 of FIG. 4 but to a larger scale.
Figure 8:
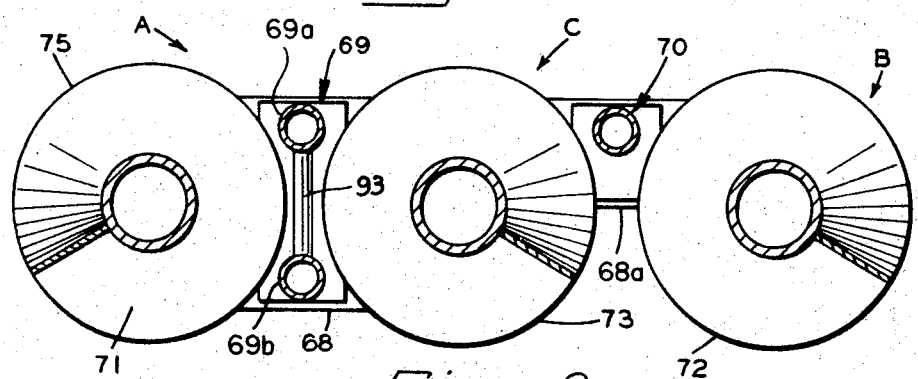
FIG. 8 is a section to the same scale as FIG. 7, along line 8—8 of FIG. 4.

The three cutting heads 41, 42, 43 are supported from and driven by a cutting head assembly 65 as shown in FIGS. 1, 2 and 3, and in more detail in FIGS. 4 to 9 inclusive. The assembly comprises a rigid frame 66 made up of a forward cross member 67 and a rear cross member 68 that are rigidly connected together by tie bars 69 and 70. Side auger sections 71 and 72 carrying auger cutting heads 41 and 42 are rotatably mounted in the cross members, and a third auger section 73 carrying cutting head 43 is rotatably mounted in cross members between sections 71 and 72. Tie bar 69 is located between auger sections 71 and 73 while tie bar 70 is between auger sections 72 and 73, and as is preferable, the axes of all three auger sections lie in the same plane (FIG. 7).

The cutting head 41 and its side auger section 71 have left hand helical vanes 74 and 75 and are rotated clockwise when viewed from the end shown in FIG. 7 so that coal cut by the head moves rearwardly. Cutting head 42 and its side auger section 72 have opposite hand or right hand helical vanes 76 and 77, and intermediate cutting head 43 and its auger section 73 have right hand helical vanes 78 and 79 and both these augers and their heads are rotated counterclockwise when viewed in FIG. 7 so that coal cut by their cutting heads moves rearwardly.

Side auger section 71 has a rear stub 81 by which it is connected to a source of power which in operation usually is one of a string of auger sections 37; similarly, side auger section 72 has a rear stub 82 by which it is connected to a source of power which in operation usually is one of a string of sections 38. Center auger section 73 has an unconnected rear stub 83 that aids in forcing the mined material into the space between the side auger sections 37 and 38.

Figure 9:
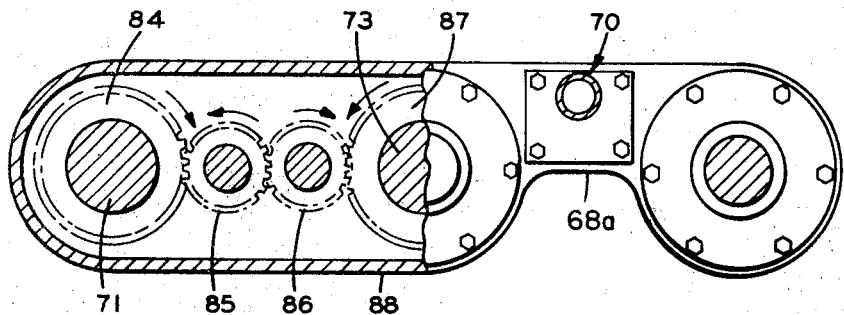
FIG. 9 is a section to the same scale as FIGS. 7 and 8, along line 9—9 of FIG. 4, showing the driving gear arrangement in the cutting head assembly.

As is apparent from FIGS. 4 and 9, as side auger section 71 positively rotates clockwise, it positively rotates intermediate auger section 73 in the opposite counterclockwise direction by a gear 84 fixed to section 71 and driving through two intermeshing idler pinions 85 and 86 a gear 87 fixed to auger section 73. The gears and pinions preferably are such that side auger sections 71 and 72 and the intermediate auger sections are all rotated at identical angular speeds in the indicated directions. The gears and pinions are in a closed dustproof, waterproof and oil tight gearcase 88 that is included in the rear cross member 68. Although other drives can be used to rotate the auger section 73 from section 71, it is preferable that the drive be through gears that provide positive drive with no slippage and permit the drive to be made so rugged as to be virtually free of breakage even while assembly 65 is deep in a coal seam, and of need for substantial maintenance.

Tie bar 69 between side auger section 71 and auger section 73 is (FIGS. 5 and 8) made up of spaced parallel upper and lower longitudinally extending members 69a and 69b rigidly bolted to cross members 67 and 68. Members 69a and 69b (FIG. 5), preferably are braced by angularly spaced struts 69c rigidly fixed to the members.

The tie bar 70 between side auger section 72 and auger section 73 (FIGS. 6 and 8) occupies only the upper portion of the space between the auger sections 72 and 73 to provide a substantially unobstructed space between these auger sections. This tie bar is also rigidly bolted to cross members 67 and 68. These cross members, (FIGS. 7 to 9 inclusive) are also recessed at 67a, 68a between auger sections 72 and 73 to permit mined coal to pass the cross members as it travels rearwardly of assembly 65.

Ripper structures 89 and 90 are respectively fixed to forward cross member 67 between heads 41 and 43, and 42 and 43, preferably where they are backed up by tie bars 69 and 70, to break up the walls of uncut coal between the holes cut by the heads and thus permit the cutting head assembly to penetrate as a whole into the coal seam and permit substantially unobstructed passage of coal between the auger sections.

Assembly 65 is such that the power means driving the side auger section 71, usually in practice comprising a long string of intermediate auger sections 37 included in auger A and driven from the driving head 28, drives both the side auger section 71 and intermediate section 73 and their cutting heads 41 and 43. The power means driving the other side auger section 72, usually in practice comprising a long string of auger sections 38 included in auger B and driven from driving head 29, drives only the side auger section 72 and its cutting head 42.

The directions of rotation of the side auger sections 71, 72 and intermediate auger section 73, and the helical directions of their vanes, are such that substantially all coal cut by their three cutting heads is moved rearwardly by the auger sections until it reaches the rear end of the cutting head assembly 65, after which it travels through the holes cut by the side cutting heads 41 and 42 and the space between the side augers until it reaches the entrance of the opening in the pit wall. There it is discharged into the auger machine and transported to a truck or other conveyance by conveyor 34 in known manner.

While the power means driving side cutting head 41 and its auger section 71 also drives the intermediate cutting head 43 and its auger section 73, it transports essentially only the coal cut by the head 41 out of the opening; the power means driving the other side cutting head 42 and its auger section 72 causes essentially all of the coal cut by both the side and intermediate heads 42 and 43 to be transported out of the pit wall opening. The total driving load is therefore distributed between the power means driving the two side augers A and B. This is highly advantageous since the power for cutting and transporting the coal must be transmitted through long strings of intermediate auger sections, and the distribution of the load between the two side augers keeps the loads on the strings within reasonable limits and substantially equivalent, thus reducing possibilities of breakage of, or damage to, parts in the auger strings or the cutting head assembly.

In the apparatus of FIGS. 1 to 10, the auxiliary gearboxes 26 and 27 and their gears that drive the two side augers A and B can be readily adjusted to permit driving of augers of larger or smaller diameters, or of varying numbers, by adjustment of the positions of the auxiliary gearboxes relative to main gearbox 25, carriage 15, and main frame 1, and by adjustment of the main gearbox relative to carriage 15 and frame 1.

The assembly comprising engine 21, clutch 22, transmission 23, and main gearbox 25 carrying the auxiliary gearboxes 26 and 27, is supported by brackets 91a, 91b, 91c and 91d fixed to the assembly and respectively supported from the carriage 15 (FIGS. 1, 10) through shims or spacers 92a, 92b, 92c and 92d. These shims make possible adjustment of the vertical location of the gearboxes relative to the carriage 15.

When the augers A and B are located as in FIGS. 1–3, 7, the auxiliary gearboxes 26 and 27 are positioned in the gearbox 25 as shown in full lines in FIG. 10. The auger A to the left in FIG. 7 is rotated clockwise from the shaft 25a by pinion 93 fixed to the shaft and driving through a train of gears 94–100 inclusive, the last of which is fixed to shaft 101 of head 28 that drives auger A. The other auger B, is rotated counterclockwise from the pinion 93 by another train of gears 103 to 108 inclusive, the last of which is keyed to shaft 109 of head 29 that drives auger B.

Auxiliary gearbox 26 that contains idler gears 97, 98, 99 and 100 is adjustably mounted on the main gearbox, being pivotally mounted at its upper end about shaft 111 that is mounted on box 25 and carries gears 97, 98; its lower portion is rigidly connected by lugs 112 bolted to selected openings of an array of openings 113 in a depending member 114 that forms part of the carriage 15. Similarly, the other auxiliary gearbox 27 is adjustably rigidly fixed with its upper end pivotally mounted about shaft 115 on gearbox 25 and its lower portion fixed by lugs 116 bolted to selected holes 117 in member 114.

FIG. 10 illustrates how auxiliary gearboxes 26, 27 can be adjusted relative to main gearbox 25, to the depending member 114, and to the main frame 1, to enable them to drive two augers that are of different diameters differently spaced apart. FIG. 10 shows in broken lines how the auxiliary gearbox faces are adjusted to permit them to drive augers A' and B' of larger diameter that are closer together than the augers of FIGS. 1–9 for which the gearboxes are shown in full lines in FIG. 10. For the positions shown in broken lines, the main gearbox 25 carrying the auxiliary gearboxes 26, 27 are also raised by replacement of shims 92a–d by higher shims such as shims 92d' and the lower ends of gearboxes 26, 27 are suitably adjusted and bolted to suitable ones of openings 113 and 117 in member 114 of the carriage, as shown in FIG. 10.

The auxiliary gearboxes can be adjusted relative to the main gearbox 25 and member 114 to still other positions by use of suitable ones of the holes 113, 117 and by use of other shims of suitable size.

As illustrated by FIG. 11, the machine can be thus adjusted to permit the driving of two cutting heads 118 and 119 of auger sections 121 and 122 of a cutting head assembly 123 that includes only two auger sections and heads which are of larger diameter and located closer together than in the previous embodiment. In a known manner, strings of auxiliary auger sections can be introduced between the cutting head assembly and the driving heads 28 and 29 of the auxiliary gearboxes as the cutting heads and assembly 123 penetrate the coal being mined.

FIGS. 12 and 13 illustrate another modification in which the auxiliary gearboxes 26 and 27 and the main gearbox 25 are adjusted as indicated above, to enable the driving heads 28, 29 of the auxiliary gearboxes to positively drive four cutting heads 124, 125, 126, 127 mounted on four auger sections 128, 129, 130, 131 in a cutting head assembly 132. Preferably the axes of rotation all lie essentially in the same plane.

Assembly 132 is generally similar to the cutting head assembly shown in FIGS. 1 to 9 inclusive. As in the previous embodiment, assembly 132 comprises a rigid frame 133 comprising a front cross member 134 in which the front portions of the auger sections are journalled, a rear cross member 135 including a gearbox 136 in which the rear portions of the auger sections are journalled, and tie members 137, 138 and 139 rigidly connecting the front and rear cross members. As indicated in FIG. 13, the outer tie members 137 and 138 provide considerable clearance below them between adjacent auger sections for passage of mined material, while the center tie bar 139 has a deep section and provides less clearance since in general mined material does not travel here. As shown in FIG. 13, the cutting heads 124, 126 and auger sections 128, 130 on one side of the center tie bar 139 rotate clockwise as viewed from the front of the cutting heads, while the cutting heads 125, 127 and auger sections 129, 131 on the other side rotate counterclockwise.

The outer auger sections 128, 129 and their cutting heads are positively rotated in the desired directions from the driving heads 28, 29 of the gearboxes 26, 27 either directly as shown in FIG. 12, or through added auger sections of auger strings between sections 128 and 129 and heads 28, 29, as the cutting head assembly penetrates the coal being mined. Auger section 128 positively rotates adjacent inner auger section 130 and its head 126 through gears 141 and 142 on the sections and intermeshing idler gear 143; similarly auger section 129 positively rotates adjacent inner auger section 131 through gears 144, 145 on the sections and intermeshing idler gear 146. The gears are all contained in dust-proof, waterproof, and oiltight gearbox 136.

The front cross member 134 and its rippers 147 substantially break down the walls of coal between the openings cut by adjacent cutting heads of the assembly 132 as it penetrates the coal. The coal that is cut by heads 124 and 126 passes rearwardly through the assembly 132 in the spaced cut by and between the cutting heads and under the tie member 137 and cross members 134, 135 being so conducted by the helical vanes on these cutting heads and their auger sections 128 and 130 until it reaches the rear of the assembly. Similarly, the coal cut by heads 125 and 127 is caused to pass rearwardly by these heads and their auger sections 129 and 131 under cross members 134, 135 to the rear of assembly 132. All the coal delivered from all heads at the rear of the assembly is conducted to the entrance of the cut opening by the auger sections in the strings driving the side auger sections 128, 129.

Thus, it is apparent that in this case each of the two driving heads 28, 29 and its associated auger sections has the load of driving two cutting heads and transporting the coal cut by such two heads, and the loads on the driving heads are substantially equal. Furthermore, to facilitate movement of mined material, the helical vanes on the outer auger sections 128 and 129 are of somewhat larger diameter than the adjacent inner sections, and have two vanes, 128a and 128b on section 128 and 129a and 129b on section 129 each providing a helix of substantially larger pitch than the single vane 130a or 131a of the adjacent inner section 130 or 131, to provide for more rapid transport of mined coal by the side sections in the assembly 132.

FIGS. 14 and 15 illustrate another modification in which four cutting heads 147, 148, 149, 150 and their auger sections 152, 153, 154, 155 are driven from the main gearbox 25 identical with that of FIGS. 1–10, through auxiliary gearboxes 157 and 158 different from those previously described but similarly adjustable as to position with respect to gearbox 25, carriage 15, and main frame 1.

Auxiliary gearbox 157 drives two driving heads 159 and 160 in the same direction by a chain 162 engaging sprockets 163 and 164 on the driving heads and a sprocket 165 on shaft 111 of gearbox 25. Sprocket 165 is driven from pinion 93 on input shaft 25a through idlers 94, 95 and 96 driving a gear 97 fixed to sprocket 165. The other auxiliary gearbox drives two driving heads 166, 167 in the opposite direction by a chain 168 engaging sprockets 169, 170 on the driving heads and a sprocket 171 on shaft 115 of gearbox 25. Sprocket 171 that is rotated is driven from pinion 93 through idlers 103 and 104 driving a gear 105 fixed to sprocket 171. The arrangement of FIGS. 14 and 15 permits each of the cutting heads 147–150 and its associated auger sections to be driven directly from the main gearbox either by direct connections to the driving heads 159, 160, 166, 167 or as augering proceeds through intermediate auger sections in the usual manner. Preferably the auger sections 152–155 are otherwise identical with corresponding sections of the embodiment of FIGS. 12 and 13.

The arrangement of FIGS. 12 and 13 is more advantageous in many cases than that of FIGS. 14 and 15 since fewer intermediate auger sections must be installed in the auger strings, although the arrangement of FIGS. 14 and 15 may be more desirable under certain conditions as when the total load on the cutting heads is relatively high.

FIGS. 16 and 17 illustrate how the aparatus of FIGS. 1 to 9 inclusive can be modified to permit the driving of a single auger 174 having a known cutting head (not shown) and auger sections of large diameter, to permit the cutting of extra large holes. In this modification, the main gearbox and the two auxiliary gearboxes of the preceding embodiments have been replaced by a single main gearbox 175 fixed to a bracket 176 that is bolted in a suitable location on the depending member 114 of the carriage 15. Gearbox 175 has journalled in it an input shaft 177 driven by a universal joint assembly 178 of conventional design from output shaft 179 of transmission 23 connected to engine 21 (FIGS. 1 and 2). A pinion 180 mounted on shaft 177 drives through idler gears 181 and 182, a gear 183 fixed to the driving head 184 to which the auger 174 is connected.

Gearbox 175 is mounted on carriage 15 by lugs 185 fixed to the gearbox and supported through shims 186 from lugs 187 on bracket 176 fixed to the carriage. Corresponding shims, not shown, support the engine 21, clutch and transmission as described in the previous embodiment. By insertion of shims 186 of the proper thickness, and shims of proper thickness at other places supporting the engine, clutch, and transmission, it is possible to adjust the elevation of the axis of the auger within wide ranges relative to carriage 15 and to the main frame 1 of the machine, to permit use of single augers of a wide range of diameters. A more limited range of adjustments, suitable for a narrower range of diameters of single augers can be obtained by merely changing the thicknesses of shims 186 while leaving the elevation of the engine, clutch and transmission unchanged relative to the carriage 15 and frame 1, since the universal joint assembly 178 makes possible satisfactory driving of the shaft 177 and auger 174 through a limited range of non-coaxial positions of the axes of shafts 177 and 179.

FIG. 18 illustrates a modification of the apparatus between the engine 21 and the main gearbox 25 or other gearbox on carriage 5 that is adapted to drive one or more augers. In this modification there is a clutch 191 between the engine 21 and transmission 23, and another clutch 192 between the transmission and the main gearbox shown as gearbox 25 of the first embodiment.

Transmission 23 is a conventional transmission containing conventional gears, not shown, that are adapted to be manually shifted by operation of gear shaft lever 23a to provide different rotational speeds between output and input shafts. As known, such a transmission should be disconnected from the engine to permit shifting of gears.

The clutch 191 between the engine and the transmission preferably is a conventional mechanical over-center clutch, such as the commercially available mechanical over-center clutch model No. 1BF-218 manufactured by Twin Disc Clutch Company of Racine, Wisconsin that contains (FIG. 19) driving clutching members 193 and 194, connected to shaft 195 driven by engine 21, that are positively engaged driven clutching members 196, 197 and 198, connected to input shaft 199 of transmission 23, solely by operation of mechanical means such as linkage 201 actuated by clutch lever shaft 202 turned by clutch control lever 22a.

The other clutch 192 preferably is a non-mechanical clutch which does not involve sole use of mechanical means to engage the clutching members of the clutch, and in which the clutching elements are impositively engaged, as by action of air pressure, liquid pressure, electricity or magnetism. One type of such clutch that may be used is an air operated clutch such as Wichita Model ATD-216, manufactured by Wichita Clutch Company, Inc. of Wichita Falls, Tex., in which (FIG. 20) driving clutching members 203, 204, connected to output shaft 179 of transmission 23, are engaged by driven clutching members 206, 207 and 208, connected to shaft 25a of gearbox 25, by expansion of an annular inflatable tube 209 inflated by air supplied at suitably controlled times through pipes 211 communicating with air passage 212 of the shaft 25a of the gearbox 25.

The dual clutch system described above has numerous advantages. The mechanical clutch 191 located between the engine and transmission is used only to disconnect the transmission from the engine to permit shifting of gears in the transmission to another speed ratio, or to permit reversal of auger rotation. In operation of an auger mining machine like the one illustrated, gears are not otherwise often shifted.

The non-mechanical clutch 192 can be readily engaged or disengaged to permit adjustment in the torque transmitted to the auger or augers during the mining operation without the necessity of shifting gears and without the necessity of adjusting the clutch at frequent intervals to compensate for wear, as is necessary when a mechanical clutch is used.

While certain clutches have been disclosed above as illustrated, others may be used. Thus, other types of mechanical clutches may be used in place of that indicated, and other types of non-mechanical clutches may be used such as an electric clutch exemplified by Stearns Electric Clutch Model E-Class S, manufactured by Stearns Electric Corporation Milwaukee, Wis.; or a hydraulic clutch as exemplified by Force Control Hydraulic Clutch Model 40C, manufactured by Force Control Inc., Newcastle, Ind. Non-mechanical clutches of these types could also be used in place of the mechanical clutch, but in general it is more desirable to have a positively engaged mechanical clutch 191 operating in conjunction with the non-mechanical clutch 192.

Apparatus embodying the invention may be adapted to drive more than the four augers illustrated. While the apparatus illustrated has been disclosed in connection with mining of coal the invention may be used for other purposes. It is also apparent that modifications other than those disclosed may be made without departing from the spirit of the invention.

It is intended that the patent shall cover by suitable expression the appendant claims, whatever features of patentable novelty reside in the invention.

What is claimed is:

1. Auger apparatus comprising rotatable auger drive means for rotatably driving an auger adapted to penetrate the earth; and means for rotating said auger drive means comprising a power supply adapted to supply power to a first rotatable shaft, a first clutch having a driving clutching member adapted to be rotatably driven by said first shaft and a driven clutching member adapted to be engaged with and rotatably driven by said driving clutching member and to be disengaged from and not driven by said driving clutch member, said clutch being adapted to have its driving and driven clutching members engaged and disengaged by control of a human operator, a transmission having an input shaft and an output shaft and adapted to change relative speeds and directions of rotation between said input and output shafts, said input shaft being adapted to be rotatably driven by said driven clutching member of said first clutch, and a second clutch having a driving clutching member adapted to be rotatably driven by said output shaft of said transmission and a driven clutching member adapted to rotatably drive said rotatable auger drive means and adapted to be engaged with and rotatably driven by said driving clutching member of said second clutch and to be disengaged from and not driven by said driving clutching member, said second clutch being adapted to have its driving and driven clutching members engaged and disengaged by control of a human operator, said first clutch being adapted to disconnect said power supply from said transmission to permit the transmission to be adjusted to change relative speeds and directions of rotation between its input and output shafts, and said second clutch being a power-operated clutch adapted by power-assisted engagement and disengagement of its clutching members to effect adjustments in the torque transmitted to and to halt and start rotation of said rotatable auger drive means without the necessity of varying its rotational speed by use of said transmission.

2. The apparatus of claim 1 in which said first clutch comprises means operating without power assistance for engaging and disengaging said clutching members of said first clutch.

3. The apparatus of claim 1 in which said auger apparatus is a mining apparatus in which said auger drive means is adapted to rotate a generally laterally extending string of auger sections of substantial length.

4. The apparatus of claim 1 in which said power supply is an internal combustion engine.

5. The apparatus of claim 1 in which said transmission is a gear-type transmission having shiftable drive means including gears between said input and output shafts to change the rotational speeds and directions of rotation of said shafts relatively to each other.

6. The apparatus of claim 1 in which said first clutch comprises means operative solely through mechanical elements for engaging and disengaging said clutching members of said first clutch.

7. The apparatus of claim 6 in which said first clutch is a mechanical over-center clutch.

8. The apparatus of claim 1 in which said second clutch is a non-mechanical clutch comprising non-mechanical means for impositively engaging and disengaging said clutching members of said second clutch.

9. The apparatus of claim 8 in which said second clutch is a fluid operated clutch.

10. The apparatus of claim 8 in which said second clutch is an air operated clutch.

11. The apparatus of claim 8 in which said secnd clutch is a hydraulic operated clutch.

12. The apparatus of claim 8 in which said second clutch is an electrically operated clutch.

* * * * *